United States Patent [19]

Müller et al.

[11] 4,028,313

[45] June 7, 1977

[54] PROCESS FOR THE PRODUCTION OF WATER-DISPERSIBLE POLYHYDROXYL COMPOUNDS

[75] Inventors: Peter Müller; Kuno Wagner; Richard Müller, all of Leverkusen, Germany

[73] Assignee: Bayer Aktiengesellschaft, Leverkusen, Germany

[22] Filed: June 15, 1976

[21] Appl. No.: 696,455

[30] Foreign Application Priority Data

June 25, 1975 Germany .......................... 2528212
Dec. 16, 1975 Germany .......................... 2556621

[52] U.S. Cl. .................. 260/77.5 AP; 260/2.5 AP; 260/2.5 AN; 260/2.5 AG; 260/2.5 AT; 260/2.5 BD; 260/29.2 TN; 260/75 NT; 260/77.5 Q; 260/77.5 MA; 260/77.5 TB; 260/77.5 AT

[51] Int. Cl.$^2$ ................. C08G 18/71; C08G 18/14; C08G 18/48

[58] Field of Search ............ 260/77.5 AP, 29.2 TN, 260/77.5 MA, 77.5 Q

[56] References Cited

UNITED STATES PATENTS

| | | | |
|---|---|---|---|
| 2,946,767 | 7/1960 | Gassmann | 260/77.5 AP |
| 3,509,103 | 4/1970 | Teague et al. | 260/29.2 TN |
| 3,989,869 | 11/1976 | Neumaier et al. | 260/29.2 TN |

*Primary Examiner*—H.S. Cockeram
*Attorney, Agent, or Firm*—Gene Harsh; Lawrence S. Pope; Frederick H. Colen

[57] ABSTRACT

This invention relates to a new process for the production of new water-dispersible polyhydroxyl compounds, to the compounds obtainable by this process and to the use thereof. An organic polyhydroxyl compound having an average molecular weight from about 400 to 10,000 which is insoluble or non-dispersible in water, is reacted with a compound containing at least one non-ionic, hydrophilic group, said compound preferably being the reaction product of a monohydroxy polyalkylene oxide and an organic polyisocyanate at an NCO-/OH ratio of about 1.2:1 to 2.2:1.

11 Claims, No Drawings

PROCESS FOR THE PRODUCTION OF WATER-DISPERSIBLE POLYHYDROXYL COMPOUNDS

BACKGROUND OF THE INVENTION

It would be of considerable interest if the relatively high molecular weight polyhydroxyl compounds known in polyurethane chemistry, which are generally insoluble and cannot be dispersed in water, were available in water-dispersible form because aqueous dispersions such as these would open up virtually every potential application for which, hitherto solutions of polyhydroxyl compounds in organic solvents have been used. In conjunction with blocked polyisocyanates, the aqueous dispersions could be used, in particular, for the production of coatings, films and impregnations. When dried, only water would evaporate, so that film-forming and sheet-forming systems of this type would be decidedly beneficial to the environment.

In foaming processes, in which water is in any case used as blowing agent, aqueous dipersions of polyhydroxyl compounds added to the conventional liquid polyols could also influence the properties of the hardened foams to a very considerable extent.

SUMMARY OF THE INVENTION

The present invention provides a method of obtaining new modified polyhydroxyl compounds which are distinquished by their dispersibility in water from the corresponding unmodified polyhydroxyl compounds. The aqueous dispersions of the new polyhydroxyl compounds modified in accordance with the present invention in water which are described below remain completely stable for a period of at least 3 months.

The present invention relates to a process for the production of water-soluble or water-dispersible polyhydroxyl compounds, distinquished by the fact that from about 0.08 to 25% of the hydroxyl groups of an organic polyhydroxyl compound having a molecular weight of from about 400 to 10,000, or of a mixture of organic polyhydroxyl compounds having an average molecular weight of from about 400 to 10,000, which are insoluble or non-dispersible in water, are reacted with a compound which contains at least one non-ionic hydrophilic group which contributes to the solubility or dispersibility of the reaction product in water and at least one group which reacts with hydroxyl groups by an addition reaction, the quantitative ratios and the functionality of the reactants in regard to the above-mentioned addition reaction being selected in such a way that the end products contain a statistical average of at least two free hydroxyl groups.

The present invention also relates to the water-dispersible polyhydroxyl compounds obtainable by this process.

Furthermore, the present invention also relates to the use of the water-dispersible polyhydroxyl compounds obtainable by this process as reactants for polyisocyanates containing optionally blocked isocyanate groups in the production of polyurethane plastics by the known isocyanate-polyaddition process.

The process according to the present invention opens up a new way of modifying the relatively high molecular weight polyhydroxyl compounds known in polyurethane chemistry, which are neither soluble nor dispersible in water, in such a way that such dispersibility is obtained. This dispersibility in water of the products obtained by the process according to the present invention provides a fundamentally new way of obtaining non-polluting systems because, in particular, the solvents which have hitherto been required for dissolving the polyhydroxyl compounds, for example in lacquer systems, may be replaced by water. Surprisingly, it has also been found that, in water-dispersed form, known polyhydroxy polyesters modified in accordance with the present invention show excellent stability in storage without any need for hydrolysis stabilizers to be added. This is particularly surprising because it is known that the hydrolytic degradation of polyester segments in plastics containing ester groups takes place more quickly, the more hydrophilic these groups are, and water-soluble products are completely hydrolyzed after only a few days.

DETAILED DESCRIPTION OF THE INVENTION

Starting compounds suitable for use in accordance with the present invention are, in particular, polyhydroxyl compounds having a molecular weight of from about 400 to 10,000 which are neither soluble nor dispersible in water, although the process according to the present invention may also be applied to corresponding compounds containing amino groups, thiol groups or carboxyl groups. The polyhydroxyl compounds used as starting materials in accordance with the present invention preferably have a molecular weight of from about 800 to 10,000 and most preferably from about 1000 to 6000. The polyhydroxyl compounds in question are:

a. polyethers, polythioethers, polyacetals, polycarbonates or polyester amides generally containing from 2 to 8 hydroxyl groups, but preferably from 2 to 4 hydroxyl groups, or b. polyesters containing from 2 to 12, but preferably from 2 to 8 hydroxyl groups, of the type known in the production of homogeneous and cellular polyurethanes. Starting compounds preferably used in the process according to the present invention are urethane-group-free polyhydroxy polycarbonates and polyhydroxy polyethers having molecular weights in the above-mentioned range and having the above-mentioned functionality which are neither soluble nor dispersible in water. However, particularly preferred starting compounds are urethane-group-free polyhydroxy polyesters having molecular weights in the above-mentioned range and having the above functionality which are neither soluble nor dispersible in water. Mixtures of different polyhydroxyl compounds may, of course, also be used as starting compounds in the process according to the present invention.

Suitable polyesters containing hydroxyl groups are, for example reaction products of polyhydric, preferably dihydric and, optionally, trihydric alcohols with polybasic, preferably dibasic carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or be unsaturated. Examples of these polycarboxylic acids are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester, terephthalic acid-bis-glycol ester. Suitable polyhydric alcohols are, for example, ethylene glycol, 1,2-propylene glycol and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers containing at least 2, generally from 2 to 8 and preferably 2 or 3 hydroxyl groups used in accordance with the present invention are also known and may be obtained, for example, by polymerizing epoxides, such as ethylene oxide, propylene oxide, butylene oxide, tetrahydrofuran, styrene oxide or epichlorhydrin on their own, for example in the presence of $BF_3$, or by adding these epoxides, optionally in admixture or successively, with starter components containing reactive hydrogen atoms, such as alcohols or amines, for example water, ethylene glycol 1,3- or 1,2-propylene glycol, trimethylol propane, 4,4'-dihydroxy diphenyl propane, aniline, ammonia, ethanolamine and ethylene diamine. Sucrose polyethers of the type described, for example, in German Auslegeschrift Nos. 1,176,358 and 1,064,938 and U.S. Pat. Nos. 3,153,002 and 2,927,918 may also be used in accordance with the present invention. In many cases, it is preferred to use polyethers of the type which predominantly contain primary OH-groups (up to about 90%, by weight, based on all the OH-groups present in the polyether). Polyethers modified by vinyl polymers of the type obtained, for example by polymerizing styrene, acrylonitrile in the presence of polyethers (U.S. Pat. Nos. 3,383,351; 3,304,273; 3,523,093 and 3,110,695; German Patent No. 1,152,536) are also suitable, as are polybutadienes containing OH-groups.

Suitable polyacetals are, for example the products which may be obtained from glycols, such as diethylene glycol, triethylene glycol, 4,4'-dioxethoxy diphenyl dimethyl methane and hexane diol, and formaldehyde. Polyacetals suitable for use in accordance with the present invention may also be obtained by polymerizing cyclic acetals.

Suitable polycarbonates containing hydroxyl groups are known and may be obtained, for example, by reacting diols, such as 1,3-propane diol, 1,4-butane diol and/or 1,6-hexane diol, diethylene glycol, triethylene glycol and tetraethylene glycol, with diaryl carbonates, for example carbonate, or phosgene.

The polyester amides include, for example, the predominantly linear condensates obtained from polybasic saturated and unsaturated carboxylic acids or anhydrides thereof and polyhydric saturated and unsaturated amino alcohols.

Polyhydroxyl compounds already containing urethane or urea groups and optionally modified natural polyols, such as castor oil, carbohydrates or starch, may also be used. Addition products of alkylene oxides with phenol-formaldehyde resins or even with urea-formaldehyde resins may also be used in accordance with the present invention.

Representatives of these compounds used in accordance with the present invention are described, for example, in High Polymers, Vol. XVI, "Polyurethanes, Chemistry and Technology", by Saunders and Frisch, Interscience Publishers, New York, London, Vol. I, 1962, pages 32 – 42 and pages 44 – 54, and Vol. II, 1964, pages 5 – 6 and 198 – 199, and also in Vieweg and Hochtlen's Kunststoff-Handbuch, Vol. VII, Carl-Hanser-Verlag, Munich, 1966, for example on pages 45 –71.

Compounds containing at least one group reacting with hydroxyl groups by an addition reaction and at least one hydrophilic group suitable for use in accordance with the present invention are preferably the reaction products of mono-hydroxy polyalkylene oxides having molecular weights of from about 500 to 5000, of the type obtained in known manner by alkoxylating monofunctional starter molecules, such as monohydric alcohols, such as methanol, ethanol, propanol or butanol, and from about 40 to 100% of whose polyalkylene oxide chain consists of ethylene oxide units and which, in addition to ethylene oxide units, preferably contain only propylene oxide units, with any organic polyisocyanates in an NCO:OH-ratio of from about 1.2:1 to 2.2:1 and, in particular, with diisocyanates in an NCO:OH-ratio of from about 1.8:1 to 2.2:1. In the preparation of the isocyanate containing at least one hydrophilic group, the quantitative ratios are preferably selected in dependence upon the functionality of the organic polyisocyanate in such a way that the reaction product formed contains a statistical average of approximately one isocyanate group. This means that the reaction of diisocyanates with monohydroxy polyalkylene oxides is preferably carried out in an NCO:OH-ratio of 2:1. By contrast, in cases where, for example, a tetraisocyanate is used, it is advisable to use an NCO:OH-ratio of 4:3.

The reaction products containing NCO-groups obtainable in this way are referred to hereinafter as "hydrophilic isocyanate components".

Any organic polyisocyanates may be used for the production thereof, although it is preferred to use known diisocyanates, triisocyanates or tetraisocyanates. The organic diisocyanates known in polyurethane chemistry are particularly preferred.

Starting components suitable for use in accordance with the present invention include aliphatic, cycloaliphatic, araliphatic, aromatic and heterocyclic polyisocyanates of the type described, for example, by W. Siefken in Justus Liebigs Annalen der Chemie, 562, pages 75 –136, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, also mixtures of these isomers, 1-isocyanato-3,3,5-trimethyl-5-isocyanatomethyl cyclohexane (DT-AS No. 1,202,785, U.S. Pat. No. 3,401,190), 2,4- and 2,6- hexahydrotolylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4-and 2,6-tolylene diisocyanate and mixtures of these isomers, diphenyl methane-2,4'- and/or -4,4'-diisocyanate, naphthylene-1,5-diisocyanate, triphenyl methane-4,4',4''-triisocyanate, polyphenyl polymethylene polyisocyanates of the type described by condensing aniline with formaldehyde, followed by phosgenation, and described for example in British Pat. Nos. 874,430 and 848,671, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Patent No. 3,152,162), diisocyanates of the type described in U.S. Pat. No. 3,492,330, polyisocyanates containing allophanate groups of the type described, for example, in British Pat. No. 994,890, in Belgian Patent No. 761,626 and in published Dutch Patent Application No. 7,102,524, polyisocyanates containing isocyanurate groups of the type described, for example in U.S. Pat. No. 3,001,973, in German Patent Nos. 1,022,789; 1,222,067 and 1,027,394 and in German Offenlegungsschrift Nos. 1,929,034 and 2,004,048, polyisocyanates containing urethane groups of the type described, for example, in Belgian Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394 (U.S. Pat. Nos. 3,124,605 and 3,201,372) and in British Pat. No. 889,050, polyisocyanates produced by telomerization reactions of the type described, for example, in U.S. Pat. No. 3,654,106, polyisocyanates containing ester groups of the type described, for example, in British Pat. Nos. 965,474, and 1,072,956, in U.S. Pat. No. 3,567,763 and in German Pat. No. 1,231,688, reaction products of the above-mentioned isocyanates with acetals according to German Pat. No. 1,072,385, polyisocyanates containing polymeric fatty acid radicals according to U.S. Pat. No. 3,455,883.

In general, it is particularly preferred to use the commercially readily obtainable polyisocyanates, for example 2,4- and 2,6-tolylene diisocyanate and mixtures of these isomers ("TDI"), 1,6-hexamethylene diisocyanate, perhydro-2,4'- and/or -4,4'-diphenyl methane diisocyanate and 1-isocyanato-3,3,5-trimethyl-5-isocyanatomethyl cyclohexane.

The reaction of the starting polyisocyanate with the monohydroxy polyalkylene oxide may be carried out both in the presence and in the absence of solvents. This reaction is preferably carried out in the absence of solvents. However, if solvents are required, the conventional inert solvents, for example acetone, methyl ethyl ketone or tetrahydrofuran, may be used. On completion of this NCO/OH-addition, the process according to the present invention is carried out by reacting the hydrophilic isocyanate component thus obtained with the compounds containing at least two hydroxyl groups mentioned by way of example in such quantitative ratios that from about 0.08 to 25% of the hydroxyl groups in the starting compounds react with the hydrophilic isocyanate components. It is apparent from the lower limits quoted above that it is entirely adequate in the process according to the present invention for the hydrophilic isocyanate component to be used in such quantities that the starting compounds are only partially modified in accordance with the present invention. This small fraction of polyhydroxyl compound modified in accordance with the present invention then serves as dispersant for the unmodified polyhydroxyl compounds left in the mixture. In the process according to the present invention, the quantitative ratios between the reactants and the functionality of the hydroxyl compounds are in addition selected in such a way that the products obtained by the process contain a statistical average of at least two hydroxyl groups and from about 2 to 40%, by weight, preferably from about 5 to 30%, by weight, of ethylene oxide units introduced in accordance with the present invention. In cases where, in particular, dihydroxy compounds are used as the starting compounds for the process according to the present invention, provision is made, preferably by simultaneously using higher than difunctional hydroxyl compounds in a quantity at least equivalent to the isocyanate groups in the hydrophilic isocyanate components, to ensure that the end products obtained by the process according to the present invention contain a statistical average of at least two hydroxyl groups per molecule. In one preferred embodiment of the process according to the present invention for modifying difunctional starting compounds, the higher than difunctional hydroxyl compounds used for compensating the OH-functionality are initially modified in accordance with the present invention on their own and subsequently mixed with the unmodified difunctional hydroxyl compound so that the mixture obtained contains hardly any compounds having an OH-functionality of lower than 2. However, this is merely a preferred embodiment of the modification of difunctional hydroxyl compounds, because it is also entirely possible for a mixture of difunctional hydroxyl compounds and polyhydroxyl compounds of higher functionality to be modified in accordance with the present invention. Although, in this case, monofunctional hydroxyl compounds are also formed in small quantities, they may also be used (because the average OH-functionality is at least 2) in the subsequent application of the mixtures modified in accordance with the present invention as starting compounds for the production of polyurethane plastics.

The reaction of the hydrophilic isocyanate components with the polyols may be carried out both in the presence and in the absence of solvents.

In one preferred embodiment, solvents which are completely miscible with water and which boil at temperatures of from about 40 to 90° C, for example acetone or methyl ethyl ketone, are preferably used. The addition reaction is carried out at moderately elevated temperatures, for example at a temperature of from about 20 to 90° C.

On completion of the reaction, the product obtained in the form of a solution may either be recovered by distilling off the solvent, or may be converted into an aqueous solution or dispersion by stirring the solution into water and subsequently distilling off the solvent. It is also possible directly to stir water into the solution and subsequently to remove the solvent by distillation.

In another embodiment, the hydrophilic isocyanate component mentioned above is combined with the polyhydroxyl compounds mentioned above in the melt and reacted at elevated temperature, for example at a temperature of from about 60 to 120° C. If, the end product of the process according to the present invention is liquid in consistency at room temperature or elevated temperature for example from about 20 to 70° C, it may be directly converted into an aqueous dispersion by introducing water with vigorous stirring. However, the reverse procedure may also be adopted, i.e. the molten end products may be stirred into water.

In another embodiment of the process according to the present invention, the end products produced in the melt, which are solid at room temperature, have added to them from about 1 to 50%, by weight, preferably from about 2 to 20%, by weight, of a water-miscible high boiling solvent, for example methyl glycol acetate or caprolactam to enable the thus obtained product to be thus-introduced into an aqueous dispersion. The reaction mixture is then combined with the required quantity of water. The presence of small quantities of high-boiling organic solvent in the aqueous dispersions does not affect either the storability or the processability of the dispersions.

One particular embodiment of the process according to the present invention is characterized by an additional modification of the polyhydroxyl compounds, i.e. in addition to the above-described non-ionic modification essential to the present invention of the polyhydroxyl compounds insoluble and non-dispersible in water, with cyclic organic acid anhydrides by reacting the polyhydroxyl compound with cyclic organic acid anhydrides, preferably organic dicarboxylic acid anhydrides, in a ring-opening addition reaction, and neutralizing the thus-introduced carboxyl groups with inorganic or organic bases to form hydrophilic carboxylate anions. In this additional modification, it is, of course, important to ensure that the quantity of acid anhydrides is selected in such a way that at least two hydroxyl groups are present in the end products containing non-ionic and ionic hydrophilic groups. In addition, the quantity of acid anhydride or the degree of neutralization of the carboxyl groups formed is generally selected in such a way that the additionally modified end products contain from about 0.01 to 5%, by weight, preferably from about 0.5 to 3%, by weight, of carboxylate groups. This small amount of carboxylate groups would generally not be sufficient on its own to quarantee the dispersibility of the starting compound in water. In general, however, the content of ethylene oxide units introduced in accordance with the present invention may be reduced to from about 2 to 12%, by weight by this additional ionic modification. In addition, the content of carboxylate groups does not have to correspond strictly to the content of carboxyl groups present on completion of the addition reaction, because these carboxyl groups may also be only partially neutralized. However, all the carboxyl groups formed as intermediates are preferably neutralized.

The additional ionic modification mentioned above may be carried out before, during and also after the non-ionic modification essential to the present invention. Preferably, the polyhydroxyl compound to be additionally ionically modified is reacted in the melt at from about 50 to 150° C, preferably from about 90 to 120° C, in a ring-opening addition reaction, followed by neutralization in the melt, in organic solution (preferably in cases where organic amines are used as neutralizing agents) or in aqueous medium.

Suitable acid anhydrides are preferably simple organic dicarboxylic acid anhydrides, such as phthalic acid anhydride, tetrahydrophthalic acid anhydride, hexahydrophthalic acid anhydride, succinic acid anhydride or maleic acid anhydride. Generally, however, it is also possible to use tricarboxylic acid anhydrides, such as 1,3,4-benzene tricarboxylic acid anhydride, or tetracarboxylic acid anhydrides, such as 1,2,4,5-benzene tetracarboxylic acid monoanhydride.

Suitable neutralizing agents are any inorganic or organic bases capable of converting carboxyl groups into carboxylate groups, such as alkali metal hydroxides, such as sodium hydroxide or potassium hydroxide, alkali metal carbonates, such as sodium carbonate or potassium carbonate, alkali metal hydrogen carbonates, such as sodium hydrogen carbonate or potassium hydrogen carbonate, ammonia, primary amines, such as methyl amine, ethyl amine and n-butyl amine, secondary amines, such as dimethyl amine, diethyl amine, dibutyl amine, diethanolamine and dipropanolamine, or tertiary amines, such as trimethyl amine, triethyl amine, pyridine, N,N-dimethyl ethanolamine, N,N-diethyl propanolamines, N-methyl diethanolamine or N-ethyl dipropanolamine. It is preferred to use the above-mentioned inorganic bases and the above-mentioned tertiary amines, especially the tertiary amines.

Another, less preferred embodiment of an additional modification of the polyhydroxyl compounds according to the present invention is characterized by the fact that the polyhydroxyl compound to be modified is reacted with monoisocyanates containing tertiary amino groups, followed by conversion of the tertiary amino, groups into ammonium groups by quaternization with a quaternizing agent or by neutralization with an acid. In this embodiment of the process according to the present invention, too, the functionality of the polyhydroxyl compound to be modified is selected in accordance with the foregoing observations, in such a way that the end products statistically contain at least two hydroxyl groups per molecule. In addition, the quantity of monoisocyanate containing tertiary amino groups or the degree of neutralization or degree of quaternization is generally selected in such a way that the end products contain from about 0.01 to 1.5% and preferably from about 0.01 to 1%, by weight, of positively-charged nitrogen atoms, $=N^+=$, in the form of ammonium cations. These small quantities of positively-charged nitrogen atoms would also generally be unable on their own to quarantee the dispersibility of the polyhydroxyl compounds. So far as a possible reduction of the content of non-ionic groups introduced in accordance with the present invention is concerned, the observations made above apply here.

The monoisocyanates containing tertiary amino nitrogen atoms may be introduced before, during or after the non-ionic modification essential to the present invention. The monoisocyanates containing tertiary amino groups are preferably introduced in solution at from about 50 to 90° C, preferably from about 55 to 60° C.

Suitable solvents are, in particular, organic watermiscible solvents which are inert to isocyanate groups, such as acetone or methyl ethyl ketone. Conversion of the tertiary amino nitrogen atoms into the corresponding ammonium cations also takes place in organic solution or even with the simultaneous addition of water (addition of aqueous acid). After water has been added and the solvent distilled off, aqueous dispersions of the end products non-ionically modified in accordance with the present invention before, during or after incorporation of the tertiary amino nitrogen atoms, as explained above, are obtained.

Suitable compounds containing tertiary nitrogen atoms and isocyanate groups are, in particular, equimolar reaction products of the diisocyanates exemplified above with monohydric aminoalcohols containing tertiary nitrogen atoms, such as N,N-dimethyl aminoethanol and N,N-diethyl-amino-2-propanol, or even reaction of the diisocyanates exemplified above with equimolar quantities of diamines which, in addition to a tertiary amino group, contain a primary or secondary amino group, such as N,N-dimethyl ethylene diamine or N,N,N'-trimethyl ethylene diamine.

Suitable quarternizing agents include any quarternizing agents capable of quarternizing tertiary nitrogen atoms, such as methyl iodide, propyl bromide, dimethyl sulphate, chloroacetamide and chloroacetic acid ethyl ester.

Suitable neutralizing agents include any inorganic or organic acids capable of neutralizing tertiary amines, such as sulphuric acid, hydrochloric acid, phosphoric acid, acetic acid, propionic acid or dimethylol propionic acid.

According to another, again less preferred, embodiment of the additional ionic modification of the end products of the process according to the present invention, the products are reacted with isocyanato sulphonic acids preferably containing one isocyanate group and at least one sulphonic acid group, the addition reaction being followed in this case, too, by at least partial neutralization of the sulphonic acid groups into sulphonate groups with the bases mentioned above. In this embodiment of the process according to the present invention, too, the observations made above in relation to the OH-functionality of the end products again apply. In this embodiment, the quantity of isocyanato sulphonic acids or the degree of neutralization is selected in such a way that the end products contain from about 0.02 to 10%, by weight, preferably from about 1.0 to 5%, by weight, of sulphonate groups, -SO$_3^-$. This small amount of sulphonate groups would also generally be unable on its own to guarantee the dispersibility of the polyhydroxyl compounds. The observations made above regarding a reduction in the content of non-ionic groups apply here, too. Incorporation of the isocyanato sulphonic acid may also be carried out before, during or after the non-ionic modification essential to the present invention. In this embodiment, too, the addition reaction preferably takes place in the presence of the solvents suggested above at a temperature of from approximately about 50° to 60° C. Especially in cases where organic bases are used, the subsequent neutralization stage may also be carried out in the presence of organic solvents or is carried out by combining the polyhydroxyl compounds containing sulphonic acid groups with an aqueous solution of the base.

Suitable isocyanato sulphonic acids are any organic compounds containing both free isocyanate groups and also sulphonic acid groups, but preferably the corresponding aromatic isocyanato sulphonic acids of the type obtainable, for example, in accordance with DT-OS No. 2,227,111 by sulphonating aromatic isocyanates. It is particularly preferred to use isocyanato sulphonic acids of the type which may be obtained from polyisocyanate mixtures of the diphenyl methane series (phosgenation products of aniline/formaldehyde condensates) by sulphonation, preferably with gaseous sulphur trioxide, followed by partial blocking of the free isocyanate groups with compounds containing an isocyanate-reactive group so that a statistical average of approximately one monoisocyanato sulphonic acid is present.

Suitable blocking agents are, in particular, the blocking agents for polyisocyanates commonly used in polyurethane chemistry, such as phenol, cresol, ε-caprolactam or cyclohexanone oxime, or even simple monofunctional alcohols ("monofunctional" in the context of the isocyanate addition reaction), such as methanol, ethanol or n-butanol, or amines, such as n-hexyl amine.

In the application of the process according to the present invention, organometallic compounds, especially organotin compounds, may be used as catalysts. Preferred organotin compounds are tin (II) salts or carboxylic acids, such as tin(II)acetate, tin(II)octoate, tin(II)ethyl hexoate and tin(II)laurate, and the dialkyl tin salts of carboxylic acids, such as dibutyl tin diacetate, dibutyl tin dilaurate, dibutyl tin maleate or dioctyl tin diacetate.

Further examples of catalysts suitable for use in accordance with the present invention and information on the manner in which the catalysts function may be found in Vieweg and Hochtlen's Kunststoff-Handbuch, Vol. VII, Carl-Hanser-Verlag, Munich 1966, for example on pages 96 to 102.

The catalysts are generally used in a quantity of from about 0.001 to 10%, by weight, based on the quantity of compounds having two isocyanate-reactive hydrogen atoms and a molecular weight of from about 400 to 10,000.

According to the present invention, it is also possible to use reaction retarders, for example acid-reacting substances, such as hydrochloric acid or organic acid halides.

For converting the products obtained by the process according to the present invention into their aqueous dispersions, water is generally used in such quantities that the dispersions have a solids content of from about 30 to 70%, by weight.

The products obtained by the process according to the present invention are not only substances which are self-dispersible in water, but they are also suitable for use as dispersion aids for polyhydroxyl compounds which have not been modified in accordance with the present invention. In many cases, it is actually sufficient to mix about 1 mole of the polyhydroxyl compound modified in accordance with the present invention with from about 5 to 15 moles of a polyhydroxyl compound which is neither soluble nor dispersible in water and which has not been modified in accordance with the present invention, of the type mentioned above as starting material for the process according to the present invention, in order to obtain a water-dispersible mixture, provided that the above-mentioned hydrophilic groups are present in the mixture in a concentration sufficient for the dispersibility of the mixture.

The aqueous dispersions of the products obtained by the process according to the present invention and mixtures thereof with polyhydroxyl compounds which have not been modified in accordance with the present invention may be used in combination with suitable reactants, such as blocked polyisocyanates, as heat-crosslinkable coating agents processible from the aqueous phase. In this case, the polyhydroxyl compounds modified in accordance with the present invention act as emulsifiers for the blocked polyisocyanates which, basically, are neither soluble nor dispersible in water.

Suitable blocked polyisocyanates of this type are the known reaction products of the polyisocyanates known in polyurethane chemistry, such as hexamethylene diisocyanate, 2,4-diisocyanato toluene, tris-(isocyanato hexyl)-biuret or the reaction product of 3 moles of 2,4-diisocyanato toluene with 1 mole of trimethylol propane, with blocking agents, such as phenol, cresol, ε-caprolactam, malonic acid diethyl ester and the like.

It is also possible, for producing two-component polyurethane systems processible from the aqueous phase, to mix aqueous dispersions of the products obtained by the process according to the present invention with aqueous dispersions of blocked polyisocyanates. Dispersions of this type are described, for example, in German Patent Application P 24 56 469.0.

In cases where such combinations of the products obtained by the process according to the present invention with blocked polyisocyanates are processed from the aqueous phase, the system is crosslinked by heating to temperatures above the resplitting temperature of the blocked polyisocyanate. When the system is heated, the water first evaporates with the crosslinking reaction beginning after the resplitting temperature of the blocked polyisocyanate has been reached.

Track-free films and coatings, which may be used for a variety of different applications, are obtained in this way.

In cases where the aqueous dispersions according to the present invention are used in foaming processes instead of the water normally used as blowing agent, foams having interesting service properties are obtained.

Preferred embodiments of the present invention are illustrated by the following Examples, although the invention is by no means limited to these embodiments.

EXAMPLES

EXAMPLE 1

Production of a hydrophilic isocyanate component:

In a 2 liter stirrer-equipped vessel, provided with an internal thermometer, stirrer, dropping funnel and gas inlet pipe, 400 g of an n-butanol-started polyethylene oxide alcohol having a molecular weight of 2000 are dehydrated in vacuo (15 Torr) for 30 minutes at 120° C. 2 ml of benzoyl chloride are then stirred into the melt cooled at 100° C. This is followed by the addition all at once of 33.6 g of hexamethylene diisocyanate.

After a reaction time of 60 minutes, the isocyanate content of the mixture is determined. The mixture has an NCO-content of from 1.8 to 1.9% NCO (calculated: 1.95%).

After cooling of the melt, the hydrophilic isocyanate component (A) suitable for further reactions is obtained in the form of a wax-like crystalline substance.

EXAMPLE 2

Production of a hydrophilic isocyanate component:

In a 1 liter stirrer-equipped vessel, 208 g of an n-butanol-started polyethylene oxide alcohol having a molecular weight of 1040 are dehydrated in vacuo (15 Torr) for 45 minutes at a temperature of 110° C. 1 ml of benzoyl chloride is introduced into the melt, followed by the addition all at once of 33.6 g of 1,6-hexamethylene diisocyanate. After a reaction time of 45 minutes, the reaction is over and the mixture has an NCO-content of 3.32% (calculated: 3.45% NCO). After cooling of the melt, the hydrophilic isocyanate component (B) suitable for further reactions is obtained in the form of a wax-like crystalline substance.

EXAMPLE 3

450 g of a polyester having a molecular weight of 1580 (osmotic) and an OH number of 264, produced from hexahydro phthalic acid anhydride, trimethylol propane and phthalic acid, are dissolved in 450 g of acetone. 144 g of the hydrophilic isocyanate component (A) of Example 1 are added to this solution in the form of a 50% solution in acetone. Following the addition of 0.6 g of dibutyl tin dilaurate, the mixture is stirred for 1.5 hours at 60° C. Thereafter, no more isocyanate may be detected in the mixture. 594 g of water are introduced into the mixture with vigorous stirring at room temperature. Removal of the acetone by distillation in vacuo leaves a storable, 50% aqueous dispersion having a viscosity of 1505 cP/25° C. The dispersed polyester contains 2.94% of OH, based on the form in which the dispersion is supplied.

The OH number of the polyester was redetermined after the aqueous dispersion had been stored for 3 months. It amounts to 2.92% of OH. Accordingly, the aqueous dispersion is completely stable. The dispersed particles have a particle diameter of 234 mm. The modified polyester has a polyethylene oxide unit content of 22.4%, by weight.

EXAMPLE 4

225 g (1.06 OH equivalents) of the polyester of Example 3 are dissolved in 255 g of acetone. 159 g of the hydrophilic isocyanate component (B) of Example 2, dissolved in 159 g of acetone, and 0.4 g of dibutyl tin dilaurate are added to this solution. The mixture is stirred for 6 hours at 60° C. 384 g of water are then introduced with vigorous stirring. A whitish dispersion with blue tinges is formed. Following removal of the acetone by distillation, this dispersion is present in the form of a storable 50% aqueous polyester dispersion. The modified polyester has a polyethylene oxide unit content of 34.9%, by weight.

EXAMPLE 5

225 g (1.06 OH-equivalents) of the polyester of Example 3 are dissolved in 225 g of acetone. A 50% acetone solution of 31.8 g of the hydrophilic isocyanate component (A) of Example 1 (0.0147 NCO-equivalents) are added to this solution. Following the addition of 0.3 ml of tin octoate, the mixture is stirred for 1.5 hours at from 50 to 60° C. 385 g of water are then added dropwise with vigorous stirring and the acetone removed by distillation in a water jet vacuum, leaving a 40% highly fluid, aqueous storable polyester dispersion having a viscosity of 40 cP/25° C. The modified polyester contains 11.4%, by weight of polyethylene oxide units.

EXAMPLE 6

225 g of the polyester of Example 3 (OH number 264) are dissolved in 225 g of acetone. 28.7 g of the hydrophilic isocyanate component (A) of Example 1, dissolved in 28.7 g of acetone, and 0.3 ml of dibutyl tin dilaurate are added to this solution, after which the mixture is heated for 1.5 hours to from 50 to 60° C. 380 g of water are then introduced with vigorous stirring, after which the acetone is distilled off in vacuo, leaving a storable dispersion. The 40% dispersion has a viscosity of 128 cP/25° C. The modified polyester contains 10:45%, by weight, of polyethylene oxide units.

EXAMPLE 7

225 g (1.06 OH-equivalents) of the polyester of Example 3 are dissolved in 225 g of acetone. 72 g (0.0332 NCO equivalents) of hydrophilic isocyanate component (A) of Example 1, dissolved in 72 g of acetone, and 0.3 ml of dibutyl tin dilaurate are added to this solution. The mixture is stirred for 2 hours at 60° C. Thereafter, no more free NCO may be detected. Another 225 g of polyester, dissolved in 225 g of acetone, are introduced into this mixture. After thorough mixing, 522 g of water are introduced and the acetone distilled off in a water jet vacuum, leaving a storable 50% aqueous dispersion having an OH content of 3.4% (polyester OH, based on the form in which the dispersion is supplied) and a viscosity of 92 cP/25° C. There is no change in the OH number of the dispersed polyester even after storage for 3 months at room temperature. The modified polyester contains 12.7%, by weight, of polyethylene oxide units.

EXAMPLE 8

In a stirrer-equipped glass vessel, 225 (1.06 OH equivalents) of the polyester of Example 3 are mixed in the melt at 100° C with 40.9 g (0.0189 NCO equivalents) of the hydrophilic isocyanate component (A) of Example 1. After a reaction time of 40 minutes at 100° C, the mixture is NCO-free. 53.2 g of glycol monomethyl ether acetate are added, the mixture is left to cool to 40° C and 212.5 g of water added with vigorous stirring. A 50% stable dispersion is obtained, its pH-value being adjusted to pH 6.6 by the addition of 7.5 ml of 1 N NaOH. The 50% dispersion contains 3.32% of polyester OH and is completely storable. The modified polyester contains 14.2%, by weight, of polyethylene oxide units.

EXAMPLE 9

200 g (0.2 OH equivalents) of a propylene glycol-started polyether, in which propylene oxide was first subjected to polyaddition in the presence of catalytic quantities of sodium alcoholate, followed in a second phase by the polyaddition of ethylene oxide, having an OH number of 56, an average molecular weight of 2000 and an average functionality of 2, are dissolved in 200 g of acetone, 36.2 g (0.0166 NCO equivalents) of the hydrophilic isocyanatecomponent (A) of Example 1, dissolved in 36.2 g of acetone, and 0.2 g of dibutyl tin dilaurate are added to this solution. The mixture is left standing for 48 hours at room temperature. 236 g of water are then added with vigorous stirring and the acetone distilled off in a water jet vacuum at room temperature. A stable, highly fluid 50% polyether dispersion in water is obtained. The polyether contains 14.1%, by weight, of polyethylene oxide units introduced by the modification according to the present invention.

EXAMPLE 10

The polyether of this Example used for producing the aqueous polyether dispersion was produced as follows and has the following composition:

Propylene oxide was first polyadded onto trimethylol propane and propylene glycol in the presence of catalytic quantities of sodium alcoholate. Ethylene oxide was then polyadded in a second phase. The liquid polyether contains primary and secondary hydroxyl groups and has an OH number of 49, an average molecular weight of 3200 and an average functionality of 2.78.

200 g of the polyether described above (0.175 OH equivalents) are dissolved in 200 g of acetone. 31.6 g (0.0146 NCO equivalents) of the hydrophilic isocyanate component (A) of Example 1, dissolved in 31.6 g of acetone, and 0.2 of dibutyl tin dilaurate, are added to this solution. The mixture is left standing for 48 hours at room temperature. 236 g of water are then added with vigorous stirring and the acetone distilled off in a water jet vacuum. A stable 50% aqueous dispersion is obtained. The dispersed polyether contains 0.59% of OH, based on the dispersion as a whole. The polyether contains 12.6%, by weight, of polyethylene oxide units introduced by the modification according to the present invention.

EXAMPLE 11

200 g (1.07 OH equivalents) of a polyester having an OH number of 290, produced from adipic acid, phthalic acid anhydride, maleic acid anhydride, 1,2-propylene glycol and timethylol propane, and 40.2 g (0.0185 NCO equivalents) of the hydrophilic isocyanate component (A) of Example 1 are mixed in the melt and the resulting mixture stirred for 1 hour at 100° C. The melt is left to cool to from 60° to 70° C, followed by the addition with stirring of 240.2 g of water. A completely stable 50% aqueous polyester dispersion is formed. The modified polyester contains 15.4%, by weight, of polyethylene oxide units.

EXAMPLE 12

225 g (1.06 OH equivalents) of the polyester of Example 3 and 40.9 g (0.0189 NCO equivalents) of the hydrophilic isocyanate component (A) of Example 1 are reacted for 30 minutes at 120° C. 26.6 g of methyl glycol acetate are then added. The mixture is cooled to 70° C, followed by the addition with vigorous stirring of 239.4 g of water. A highly viscous 50% dispersion is formed which may be converted very easily by the addition of a little more water into a highly fluid, aqueous stable polyester dispersion. The modified polyester contains 14.2%, by weight, of polyethylene oxide units.

EXAMPLE 13

Production of a two-component stoving lacquer dispersed in water:

412.5 g of the polyester of Example 3 having an OH-number of 264, produced from hexahydrophthalic acid anhydride, trimethylol propane and phthalic acid, and 132 g of the hydrophilic isocyanate component (A) of Example 1 are reacted in the melt at 100° C. After a reaction time of 30 minutes, the reaction mixture is left to cool, giving a water-dispersible polyester glycol having a hydroxyl content of 5.88%, by weight, and a polyethylene oxide unit content of 22.4%, by weight.

150 g (0.52 OH-equivalents) of this modified polyester and 180 g (0.52 blocked NCO-equivalents) of a triisocyanatohexyl biuret blocked with malonic acid diethyl ester are dissolved in 330 g of acetone. 330 g of water are introduced with stirring into these solutions at room temperature. Removal of the acetone by distillation in a water jet vacuum leaves a stable, 50% aqueous lacquer dispersion. The dispersion is adjusted to pH 7.3 by the addition of 3 ml of 1 N NaOH. It has a viscosity of 102 cP/25° C.

EXAMPLE 14

Practical Example (coating):

112 g (0.53 OH-equivalents) of the polyester used in Example 3 and 36 g (0.0166 NCO-equivalents) of the hydrophilic isocyanate component (A) of Example 1 are reacted in the melt at 100° C following the addition of 0.01 g of tin octoate. After a reaction time of 1 hour, the reaction is over. 181 g (0.616 blocked NCO-equivalents) of a triisocyanatohexyl biuret completely blocked with ε-caprolactam and 69 g of methyl glycol acetate are then added to the melt. After thorough mixing, the mixture is cooled while stirring to 60° C, followed by the addition with vigorous stirring of 495.5 g of water. A 40% lacquer dispersion is formed having a viscosity of approximately 33 seconds, as measured in a 4 mm orifice cup in accordance with DIN 53 211.

Layers are applied to 0.5 mm thick steel plate by means of a spray gun. After stoving, the layers are approximately 40 micrometers thick. The stoving conditions are 30 minutes at 180° C. The appearance is clear with a smooth, level surface. The mechanical data are entirely satisfactory (Erichsen indentation to cracking of the steel substrate; impact elasticity amounts to 40 to 80 inch pounds, and flexural elasticity on a conical mandrel is fault free to the smallest bending radius). Solvent resistance to the above mentioned solvents is satisfactory after from 1 to 1.5 minutes where stoving is carried out for 30 minutes at 160° C, and after 10 minutes where stoving is carried out for 30 minutes at 180° C.

In another batch, the dispersion of the above-mentioned reactants is ground with 70 parts, by weight, of titanium dioxide, based on 100 parts, by weight, of the solid, for 30 minutes in a bead mill and the thus obtained white lacquer applied to steel plate in the conventional way by means of a hand spray gun operated by compressed air, and stoved for 30 minutes at 180° C. The thus obtained coating is glossy in appearance. Its lacquer properties are favorable and correspond to that of the pure binder. Elasticity, measured by Erichsen indentation (DIN 53 156), amounts to approximately 8.5 mm. The other mechanical data and solvent resistance are comparable with the above mentioned values of the clear lacquer.

EXAMPLE 15

Practical Example (foam production):

200 g (0.235 OH-equivalents) of a polyester (2% OH), produced from phthalic acid anhydride, maleic acid anhydride, trimethylol propane, perhydro bisphenol and 1,6-hexane diol, are dissolved in 200 g of acetone. 41.4 g of the hydrophilic isocyanate component (A) of Example 1, dissolved in 41.4 g of acetone, and 0.3 g of dibutyl tin dilaurate are added to this solution, and the mixture left standing for 48 hours at room temperature. 241.4 g of water are then added dropwise to the mixture, and the acetone subsequently removed in vacuo. The 50% aqueous, stable polyester dispersion (polyethylene oxide unit content of the modified polyester: 15.8%, by weight) is adjusted to pH 7.2 and used for the production of a polyurethane foam.

Foam production:

8 g of the dispersion described above are thoroughly mixed with 96 g of the liquid polyether described in Example 10 having an OH-number of 49 (for production of the polyether, see Example 10), 1.2 g of a standard commercial-grade polyether siloxane stabilizer, 0.2 g of triethylene diamine and 0.25 g of a tin(II)salt of 2-ethyl caproic acid.

50 g of tolylene diisocyanate (80% of 2,4- and 20% of 2,6-isomer) are added to this mixture, followed by thorough mixing using a high-speed stirrer. After a cream time of 10 seconds, foaming begins and a white, flexible, elastic, open- and fine-pored polyurethane foam is formed. The polyether ester foam shows increased compression hardness and improved tear strength in relation to a comparison sample (the pure polyether foam).

EXAMPLE 16

In a 1 liter stirrer-equipped vessel, 208 g of an n-butanol-started polyethylene oxide alcohol having a molecular weight of 1040 are dehydrated in vacuo (15 Torr) for 45 minutes at 110° C. 0.1 ml of benzoyl chloride and 0.1 g of p-toluene sulphonic acid methyl ester are introduced into the melt, followed by the addition all at once of 53.4 g of tris-isocyanatohexyl biuret (NCO:OH-molar ratio 3:2). After a reaction time of 90 minutes, the reaction is over. The mixture then has an NCO-content of 1.58% (calculated 1.60% NCO). After cooling of the melt, the hydrophilic isocyanate component (C) suitable for further reactions is obtained in the form of a wax like crystalline substance.

212.5 g of the polyester of Example 3 are melted at 120° C. 26.25 g of the hydrophilic isocyanate component (C) are added to the resulting melt. The mixture is stirred for 3 hours at 100° C. Thereafter, 100 ml of acetone and 238.8 g of water are introduced with vigorous stirring at 25° C. A whitish blue-tinged dispersion is formed which, following removal of the acetone by distillation, is present in the form of a storable 50% aqueous polyester dispersion.

EXAMPLE 17

1310 g (0.5 mole) of an n-butanol-started polyether, in which propylene oxide and ethylene oxide were polyadded in a mixing ratio of 50:50 in the presence of catalytic quantities of sodium alcoholate (OH-number 21.5), and 1 g of p-toluene sulphonic acid are dehydrated for 30 minutes at 120° C/12 Torr. 84 g (0.5 mole) of a hexamethylene diisocyanate are then added to the mixture all at once. The mixture is stirred under nitrogen for another 30 minutes at 120° C. Thereafter, the prepolymer formed has an NCO-content of 1.4% (calculated at 1.5%).

The viscous resin has an average molecular weight of 2788.

EXAMPLE 18

170 g of the polyester of Example 3 and 139.4 g of the hydrophilic isocyanate component of Example 17 are mixed at 100° C, followed by stirring under nitrogen for 1 hour at 100° C. Thereafter, no more free NCO may be detected. 309.4 g of distilled water are stirred in portions into the melt having a temperature of from 90° to 100° C. A white, storable low-viscosity 50% polyester dispersion in water is formed. The modified polyester contains 18.3% of polyethylene oxide units.

EXAMPLE 19

170 g of a polyester having an OH-number of 264 and an acid number of 23.8, produced from hexahydrophthalic acid anhydride, trimethylol propane and phthalic acid, are melted under nitrogen at 100° C. 69.7 g of the hydrophilic isocyanate component of Example 17 are introduced into the melt. The reaction mixture is then stirred for 1 hour at 100° C. Thereafter, no more free NCO may be detected. Without further heating, 5.4 g of 2-dimethyl-aminoethanol are added to the melt, followed by the addition in portions after thorough mixing of 265 g of distilled water. A 48% storable whitish, blue-tinged polyester dispersion is obtained. The modified polyester contains 1.09%, by weight, of carboxylate groups and 11.5% of ethylene oxide units.

EXAMPLE 20

340 g of the polyester of Example 3 are dehydrated for 30 minutes at 140° C/12 Torr. 43.3 g of the hydrophilic isocyanate component of Example 1 are then added to the melt at 120° C. The melt is stirred under nitrogen for 1 hour at 120° C. Thereafter, no more free NCO may be detected. 26.2 g of phthalic acid anhydride are then added to the melt. After a reaction time of 70 minutes under nitrogen at 120° C, the acid number of the modified polyester is determined: it amounts to 28.4 (calculated 28.1). 14.5 g of 2-dimethylaminoethanol are added to the hot melt of the polyester modified in this way, followed by the introduction in portions of 714 g of distilled water. A 37.3% white-blue polyester dispersion is formed. The modified polyester contains 9.45%, by weight, of ethylene oxide units and 1.53%, by weight, of carboxylate groups.

EXAMPLE 21

200 g of the polyester of Example 3 are dehydrated for 30 minutes at 140° C/15 Torr and reacted under nitrogen for 1 hour at 100° C with 19.55 g of the hydrophilic isocyanate component of Example 1. Thereafter, no more free NCO may be detected. 15.43 g of phthalic acid anhydride are then introduced into the hot melt. The melt is stirred under nitrogen for 2 hours at 120° C. The acid number of the modified polyester is then determined: it amounts to 26.7 (calculated 27.5).

8.54 g of 2-dimethylaminoethanol and then 565.3 g of hot distilled water are added in portions to the melt having a temperature of 100° C. A 30.1% polyester dispersion in water is obtained. The carboxylate group content amounts to 1.57%, by weight, and the ethylene oxide unit content to 7.45%, by weight.

EXAMPLE 22

340 g of the polyester of Example 3 are reacted as described in Example 21 with 25.5 g of hydrophilic isocyanate component from Example 1 and then with 26.3 g of phthalic acid anhydride. Thereafter, the modified polyester has an acid number of 28.4 (calculated 28.1).

14.5 g of 2-dimethylaminoethanol and 750 g of hot distilled water are then introduced into the hot melt. A storable 35% polyester dispersion is formed. The carboxylate group content amounts to 1.60%, by weight, and the ethylene oxide unit content ($-CH_2-CH_2-O-$), amounts to 5.8%, by weight.

EXAMPLE 23

340 g of the polyester of Example 3 are reacted as in Example 21 with 10.85 g of hydrophilic isocyanate component from Example 1 and then with 26.3 g of phthalic acid anhydride. The modified polyester has an acid number of 29.2 (calculated 29.1).

14.5 g of 2-dimethylaminoethanol and 787 g of hot water are then introduced in portions into the hot melt. A storable white thinly liquid 33.2% polyester dispersion is formed. The carboxylate group content amounts to 1.67%, by weight, and the ethylene oxide unit content, ($-O-CH_2-CH_2-$), amounts to 2.56%, by weight.

Although the invention has been described in considerable detail in the foregoing, such detail is solely for the purpose of illustration. Variations may be made by those skilled in the art without departing from the spirit and scope of the invention.

What is claimed is:

1. A process for the production of water-dispersible polyhydroxyl compounds comprising reacting from about 0.08 to 25% of the hydroxyl groups in an organic polyhydroxyl compound having a molecular weight of from about 400 to 10,000 or in a mixture of organic polyhydroxyl compounds having an average molecular weight of from about 400 to 10,000, which are neither soluble nor dispersible in water, with a compound which contains at least one non-ionic hydrophilic group which contributes to the solubility or dispersibility of the reaction product in water and at least one group which reacts with hydroxyl groups in an addition reaction, the quantitative ratios and the functionality of the reactants in regard to said addition reaction being selected in such a manner that the products obtained by the process contain a statistical average of at least two free hydroxyl groups.

2. The process of claim 1, wherein the compound containing at least one non-ionic hydrophilic group responsible for the solubility or dispersibility of the reaction product in water and at least one group capable of an addition reaction with hydroxyl groups is a reaction product of a monohydroxy polyalkylene oxide having a molecular weight of from about 500 to 5000 and having from about 40 to 100% of the polyalkylene oxide chain consisting of ethylene oxide units, with an organic polyisocyanate in an NCO:OH-ratio of from about 1.2:1 to 2.2:1.

3. The process of claim 2, wherein the structure and quantitative ratios of the reactants are selected in such a manner that the product obtained by the process contains from about 2 to 40%, by weight, of introduced ethylene oxide units.

4. The process of claim 1, wherein the polyhydroxyl compound to be modified is reacted before, during or after the non-ionic modification with cyclic organic acid anhydrides in a ring-opening addition reaction, after which the carboxyl groups thus introduced, on completion of the ring-opening addition reaction, are at least partially neutralized by neutralization with an organic or inorganic base, the acid anhydrides or the degree of neutralization being selected in such a manner that the products obtained by the process contain from about 0.01 to 5%, by weight, of carboxylate groups, -COO⁻.

5. The process of claim 1 wherein the polyhydroxyl compound to be modified is reacted before, during or after the non-ionic modification with monoisocyanates containing tertiary amino groups, followed by conversion of the tertiary amino groups into ammonium groups by quaternization with a quaternizing agent or by neutralization with an acid, the quantity of monoisocyanate containing tertiary amino groups or the degree of neutralization or the degree of quarternization being selected in such a manner that the products obtained by the process contain from about 0.01 to 1.5% by weight of positively-charged nitrogen atoms, $=N=^+$, in the form of ammonium cations.

6. The process of claim 1 wherein the polyhydroxyl compound to be modified is reacted before, during or after the non-ionic modification with isocyanato sulphonic acids containing one isocyanate group and at least one sulphonic acid group in an addition reaction, after which the sulphonic acid groups are at least partially neutralized into sulphonate groups with an organic or inorganic base, the quantity of isocyanato sulphonic acids or the degree of neutralization being selected in such a manner that the products obtained by the process contain from about 0.02 to 10% by weight of sulphonate groups, $-SO_3^-$.

7. Water-soluble or water-dispersible polyhydroxyl compounds obtainable in accordance with the process of claim 1.

8. Water-soluble or water-dispersible polyhydroxyl compounds obtainable in accordance with the process of claim 4.

9. Water-soluble or water-dispersible polyhydroxyl compounds obtainable in accordance with the process of claim 5.

10. Water-soluble or water-dispersible polyhydroxyl compounds obtainable in accordance with the process of claim 6.

11. In a polyisocyanate-polyhydroxyl polyaddition process for the production of polyurethane plastics, the improvement comprising using the water-soluble or water-dispersible polyhydroxyl compounds obtained by the process of claim 1 as the polyhydroxyl reactant.

* * * * *